No. 698,094. Patented Apr. 22, 1902.
T. WRIGHTSON & J. MORISON.
DIRECT ACTING ENGINE.
(Application filed Dec. 9, 1901.)
(No Model.) 3 Sheets—Sheet 1.
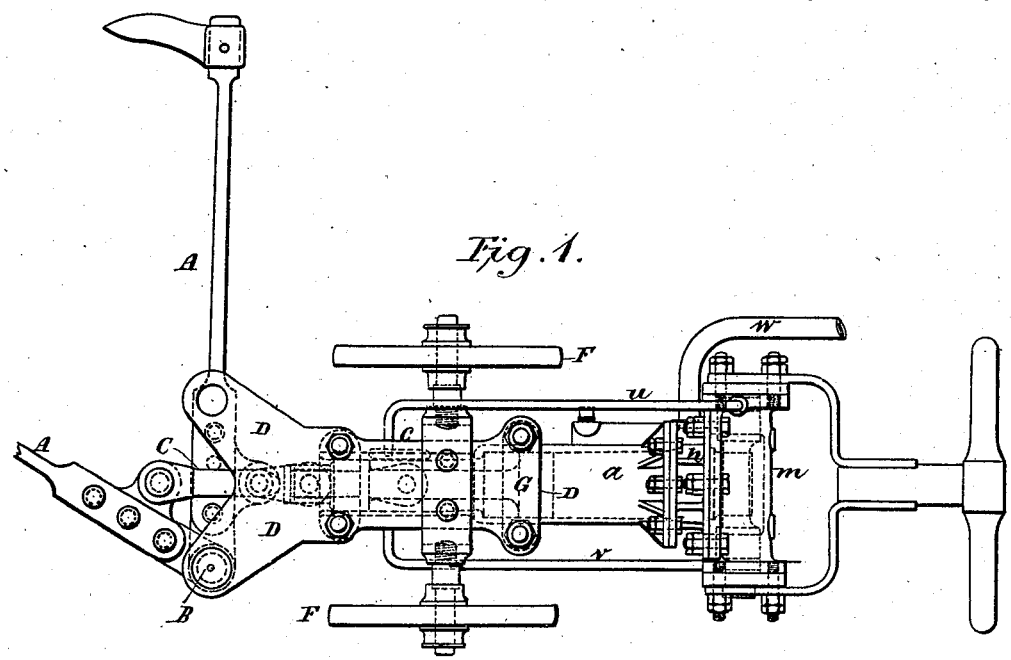
Fig. 1.
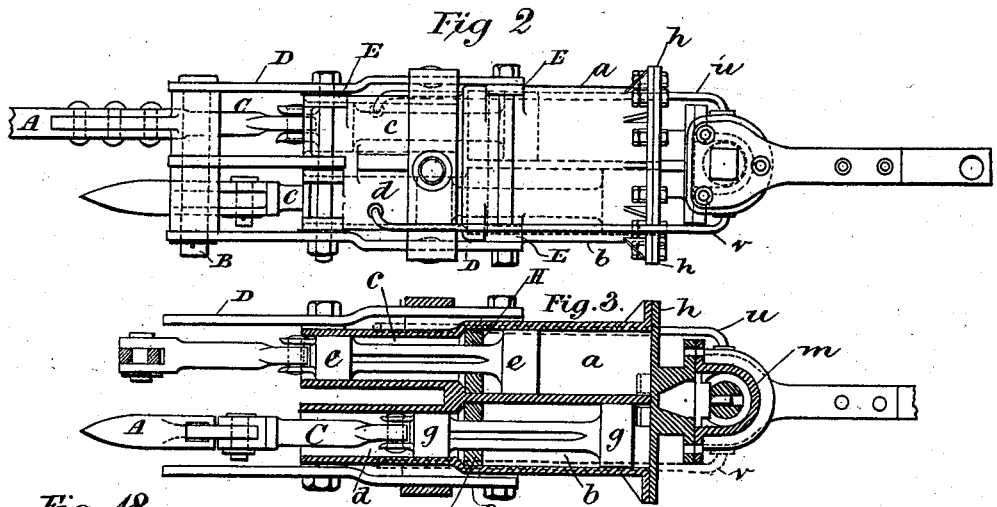
Fig. 2.
Fig. 3.
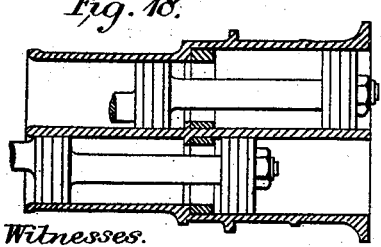
Fig. 18.
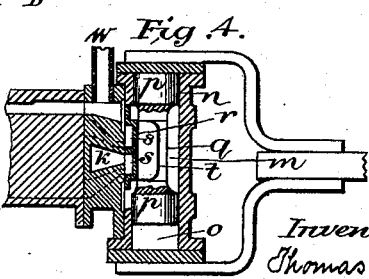
Fig. 4.

No. 698,094. Patented Apr. 22, 1902.
T. WRIGHTSON & J. MORISON.
DIRECT ACTING ENGINE.
(Application filed Dec. 9, 1901.)
(No Model.) 3 Sheets—Sheet 2.
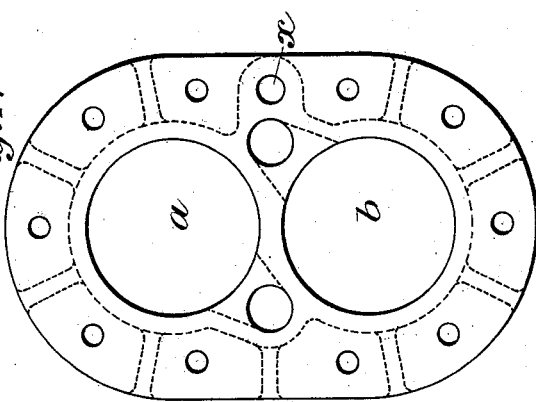
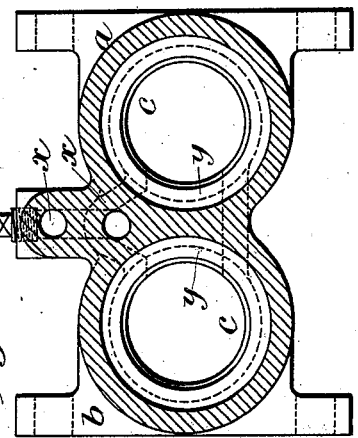
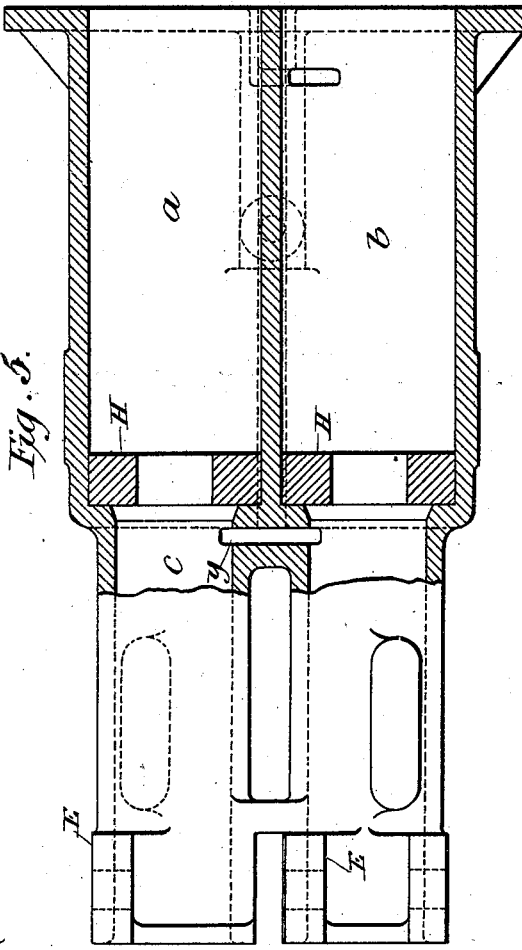
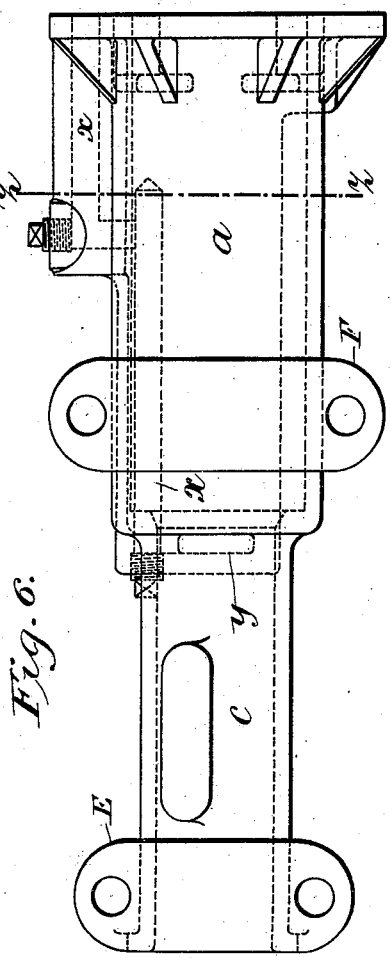

No. 698,094. Patented Apr. 22, 1902.
T. WRIGHTSON & J. MORISON.
DIRECT ACTING ENGINE.
(Application filed Dec. 9, 1901.)
(No Model.) 3 Sheets—Sheet 3.
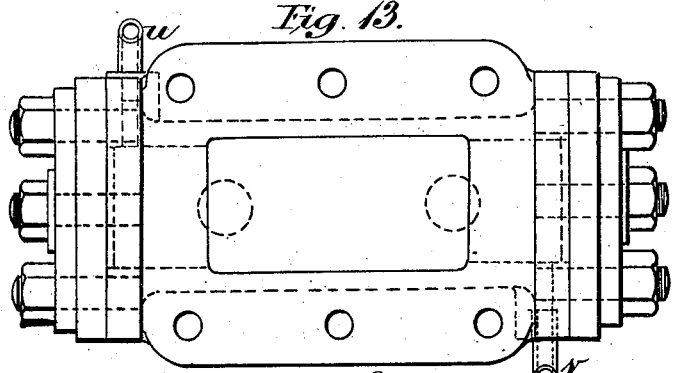
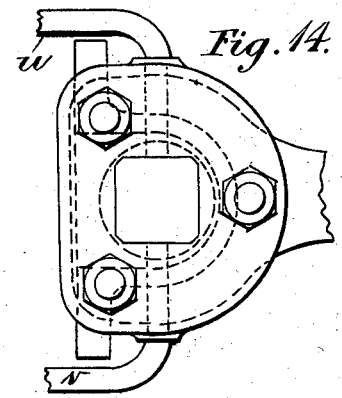
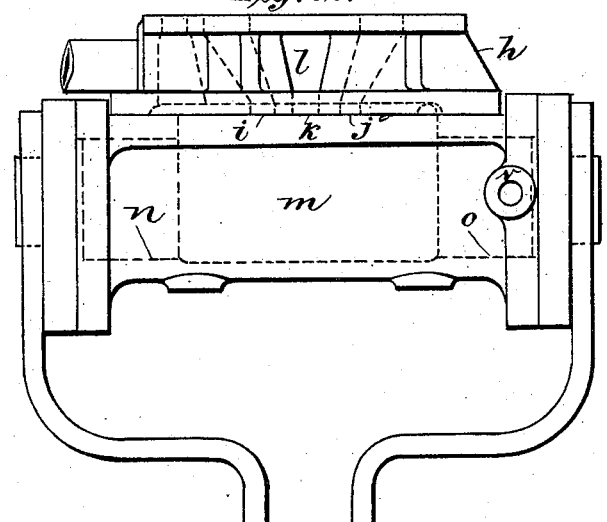
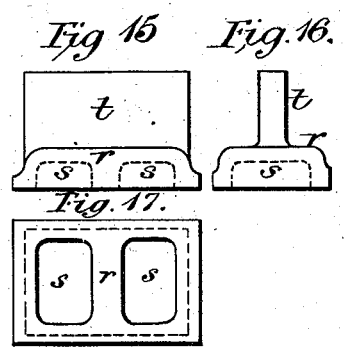
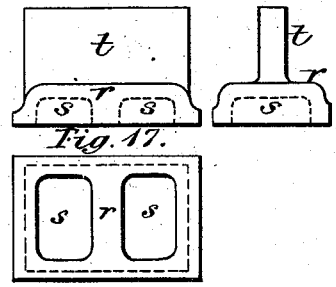
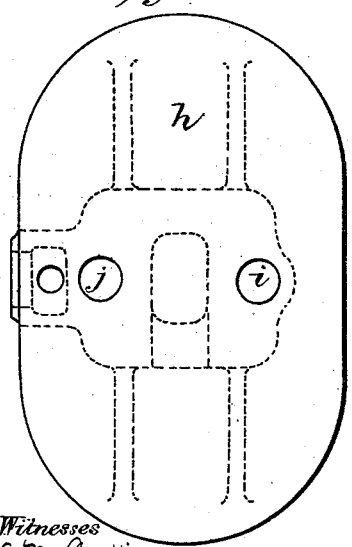
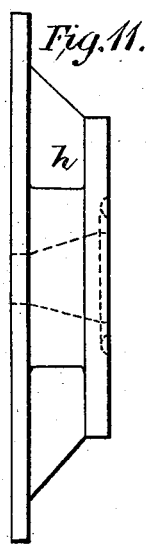
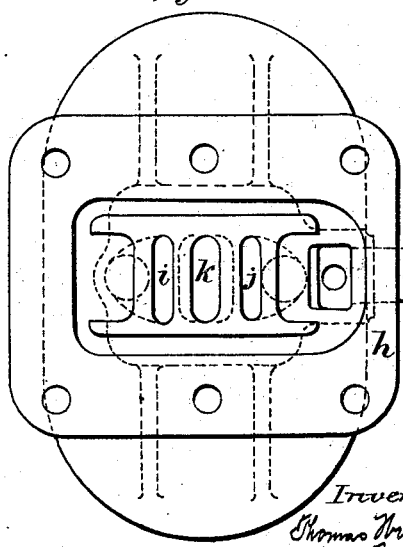

UNITED STATES PATENT OFFICE.

THOMAS WRIGHTSON, OF WESTMINSTER, AND JOHN MORISON, OF CRAMLINGTON COLLIERY, ENGLAND.

DIRECT-ACTING ENGINE.

SPECIFICATION forming part of Letters Patent No. 698,094, dated April 22, 1902.

Application filed December 9, 1901. Serial No. 85,221. (No model.)

*To all whom it may concern:*

Be it known that we, THOMAS WRIGHTSON, baronet, M. P., residing at 5 Victoria street, in the city of Westminster, and JOHN MORISON, mining-engineer, residing at Cramlington Colliery, in the county of Northumberland, England, subjects of the King of Great Britain, have invented certain new and useful Improvements in or in Connection with Direct-Acting Engines Applicable for Coal-Cutting, Mining, Drilling, Tunneling, Stamping Ore, Pile-Driving, and the Like, of which the following is a specification.

The machine is of the reciprocating percussive type and is formed with two cylinders side by side, each actuating a pick or tool and acting alternately. Each cylinder is fitted with a piston, which has a piston-rod extending forward from it and carrying a second piston, which works in a cylinder of smaller diameter than the first and which extends from its end. This second cylinder is open at its outer end, and a rod extends forward from it to carry or actuate a pick or tool. In a machine for mining coal the picks or tools may be either socketed directly into the piston-heads or the rod may give movement to a swinging arm, the end of which carries the tool. The forward stroke of each pair of pistons is effected by admitting air or other fluid under pressure to the rear end of the larger cylinder. The backward movement of the pistons is caused by the space between the two pistons of each pair being kept supplied continuously with fluid under pressure from the fluid-supply, whereby the larger pistons will be pressed back with a constant pressure depending upon the difference in area of the larger and smaller pistons. By this arrangement of double pistons stuffing-boxes are dispensed with and the pistons can give a free blow.

The valve used for alternately putting the rear end of one of the two large cylinders in communication with the exhaust and the rear end of the other large cylinder in communication with air or other fluid under pressure may be an ordinary slide-valve moved to and fro by a double-headed piston, the two heads of which enter two small cylinders at opposite ends of the valve-chest, the inner ends of these small cylinders being open to the interior of the valve-chest and their outer ends put into communication by pipes with ports formed in the sides of the two smaller cylinders. When the piston in one of these two smaller cylinders is making its forward stroke in the act of delivering a blow and when the port in the side of the cylinder is open to the space between the larger and smaller pistons, the air in this space being constantly under pressure the pressure is communicated through the small pipe to the outer end of one of the heads of the double-headed piston. When the piston in the other smaller cylinder makes its return stroke and passes back beyond the port in the side of the cylinder, it permits of the escape of air or fluid from the small pipe which opens into the cylinder and so relieves the opposite end of the double-headed piston from pressure, and the double-headed piston is thereby caused to be moved endwise and the valve shifted from one position to another. This movement of the valve causes air or fluid under pressure to be admitted to the rear end of the larger cylinder whose piston has made its backward stroke and at the same time opens the rear end of the other larger cylinder to the exhaust. This action is repeated alternately first by the movement of one of the smaller pistons and then by the movement of the other. The action whereby the back-going piston is the means of operating the valve admits of the tool giving either a full stroke or shortened stroke and avoids all dead-points. The position of the ports or openings in the sides of the two smaller cylinders is so arranged as to cushion the piston in its back stroke before it touches the cylinder-head, and its position may be altered to suit various pressures or weight of reciprocating parts. The pistons may be cushioned in the forward stroke by inserting a diaphragm-plate between the larger and the smaller cylinders and by cutting a groove or grooves along the piston-rod, which will permit air or fluid under pressure to pass freely from one side of the diaphragm to the other during the greater part of the forward stroke until a portion of the piston-rod along which the groove does not extend passes into the opening through the diaphragm. The passage of air or fluid past the diaphragm is thus to some extent arrested and the air or fluid which is then imprisoned in front of the larger piston forms a cushion to gradually bring the piston to rest. For undercutting coal or like work the two cylinders may be mounted upon a supporting-carriage on wheels, so that the machine may readily be shifted to and fro.

The advantages derived from using two cylinders in the manner above described are that the pistons may strike full strokes or short strokes if they are stopped from completing their full strokes and the pistons always return whether they complete a full stroke or not. There is also no dead-point in the machine, and the movement of one pick in one direction will to some extent balance the simultaneous movement of the other pick in the opposite direction and so render the machine easier to hold to its work. The effect of the blow of one pick will also tend to free the other pick should it have become fixed in the coal or material being cut.

Figure 1 is a plan view of a swinging-pick machine constructed as above described. Fig. 2 is a side elevation with the supporting-wheels removed, and Fig. 3 is a vertical section of the same. Fig. 4 is a horizontal section of the rear end of the machine. Fig. 5 is a side elevation, mostly in section, on a larger scale, of the cylinders; Fig. 6, a plan, and Fig. 7 an end view, of the same. Fig. 8 is a section on the line $z\,z$, Fig. 6. Fig. 9 is a front view; Fig. 10, a back view of the casting which forms the cover for the rear end of the larger cylinders, and Fig. 11 a side elevation of this casting. Fig. 12 is a plan view of a valve-chamber secured to the back of the above casting; Fig. 13, a front view of the valve-chamber, and Fig. 14 an end view. Figs. 15, 16, and 17 show side, end, and face views of the slide-valve. Fig. 18 shows a modification in which the large and small cylinders are eccentric to one another.

$a\,b$ are two cylinders, one above the other.

$c$ is a cylinder of smaller diameter in front of the cylinder $a$, and $d$ a small-diameter cylinder in front of the cylinder $b$.

$e\,e$ are pistons coupled by a rod $f$ and fitting the cylinders $a\,c$, and $g\,g$ are pistons coupled by a rod and fitting the cylinders $b\,d$.

The rear ends of the cylinders $a\,b$ are closed by a cover $h$, the back face of which is a valve-face having two ports $i\,j$ formed through it, leading to the rear ends of the two cylinders $a\,b$, and a central port $k$, leading to an exhaust-passage $l$.

$m$ is a casing secured to the back of the cover $h$. $n\,o$ are two cylinders at the two ends of this casing and in line with one another.

$p\,p$ are two pistons coupled by a rod $q$ and one working in the cylinder $n$, the other in the cylinder $o$.

$r$ is a slide-valve having two arched cavities $s$ formed in it. On the back of the slide-valve is a projection $t$, fitting into a slot in the rod $q$, so that if $q$ is moved endwise the slide-valve moves with it.

$u$ is a small pipe passing from the outer end of the cylinder $n$ to the side of the cylinder $c$, and $v$ a pipe extending from the outer end of the cylinder $o$ to the side of the cylinder $d$.

$w$ is a pipe by which air or fluid under pressure is admitted through a port formed through the cover $h$ into the interior of the valve-chamber $m$. A passage $x$, also supplied with air under pressure from the pipe $w$, leads to a port $y$, opening into the rear ends of the two smaller cylinders $c\,d$, and thus the spaces between the pistons $e$ and the spaces between the pistons $g$ are always filled with air under pressure.

The action of the engine is as follows: When the valve is in the position shown in Fig. 4, air is being admitted to the rear end of the lower cylinder $b$ to drive forward the pistons $g$. As the foremost piston $g$ passes the end of the small pipe $v$ air under pressure enters this pipe, and if the pistons $e$ have made their backward stroke and so left the end of the pipe $u$ open to the outer air the valve $r$ will be shifted endwise and put into position for causing the upper pair of pistons to be thrown forward. It is not necessary that the pistons $e$ or the pistons $g$ should fully complete their forward strokes to cause the valve $r$ to be shifted to and fro. So long as the foremost piston $e$ in its forward stroke passes the end of the pipe $u$ or the foremost piston $g$ passes the pipe $v$ the valve $r$ will be caused to shift its position, whether the pistons are able to complete their forward movement or are prevented by some obstruction from doing so.

In Figs. 1 and 2 the pistons are shown as being used for giving motion to two swinging picks A, which can be swung to and fro around a pin B. One pick-arm is coupled by a link C with a rod extending forward from the piston $e$ and the other pick-arm being coupled by a similar link C with a rod extending forward from the piston $d$. The pin B is carried by plates D, fixed by bolts to lugs E, projecting from the cylinders. As shown, the plates are so formed that the pin can be put in one or other of two positions, so that the picks may either swing from right to left or left to right.

F F are supporting-wheels mounted on axles which project from a square loop G, riveted to the upper and lower plates D.

H H are division-plates between the larger and smaller cylinders. The piston-rods $f$ pass through and fit within holes in these plates and have grooves formed along them for the greater part of their length, which allow air to pass freely from the one cylinder to the other, except just at the end of the stroke, when the passage of air is almost entirely arrested, and the air more or less imprisoned in front of the larger piston forms a buffer to gradually bring the piston to rest.

In place of the pistons and piston-rods being used to give a swinging motion to picks the rods projecting forward from the smaller pistons may be formed with hammer-heads or with sockets for carrying picks or cutting-tools. In place also of the small cylinders and large cylinders being concentric one with the other they might be eccentric. The rods also which project forward from the smaller pistons might be still more eccentric to the larger piston, and the two rods can thus be brought closer together, as illustrated in Fig. 18.

What we claim is—

1. The combination of the pair of cylinders $a$, $c$ the pair of cylinders $b$, $d$ the pistons $e$ fitting these cylinders the rods $f$ coupling the pistons in each pair of cylinders, means for admitting air or fluid under pressure continuously to the space between the pistons in each pair, a valve-chamber, two small cylinders at opposite ends of this chamber, pistons fitting these small cylinders, a rod coupling the pistons together, valve mechanism operated by the movement of the pistons in these small cylinders by which air or fluid is alternately admitted to the rear end of the cylinder $a$ and to escape from rear end of $b$ or to enter the rear end of $b$ and escape from $a$, a pipe passing from the outer end of one of the small cylinders to some point at the side of the small cylinder $c$ and another similar pipe passing from the outer end of the other small cylinder to the side of the small cylinder $d$.

2. The combination of the pair of cylinders $a$ $c$, the pair of cylinders $b$ $d$, the pistons $e$ fitting these cylinders the rods $f$ coupling the pistons in each pair of cylinders, means for admitting air or fluid under pressure continuously to the space between the pistons in each pair whereby owing to the difference in area between the pistons the pistons are normally driven back into their cylinders, means for admitting air or fluid under pressure to the rear end of the larger cylinder of one pair to drive forward the pistons of that pair while at the same time air or fluid is allowed to escape from the rear end of the larger cylinder of the other pair and the pistons of this pair allowed to make their backward stroke.

3. The combination of two parallel pairs of cylinders each pair consisting of a cylinder closed at its rear end and a smaller cylinder projecting from its front end and opening into it, the pistons of these cylinders, rods connecting the pistons of each pair, means for admitting fluid under pressure continuously to the space between the pistons of each pair, a port in the side of each small cylinder past which the piston of that cylinder travels to and fro alternately opening that port to the outer air and to fluid under pressure in the space between the pistons, pipes leading from these ports to two small cylinders, the pistons of these cylinders simultaneously moved to and fro at the times when one of the above ports is opened to the air and the other to fluid under pressure, and valve mechanism operated by the to-and-fro movement of these pistons to alternately admit fluid under pressure to the rear end of the larger cylinder of one pair and then to the other and simultaneously allow it to escape from the rear end of the larger cylinder which is not having fluid under pressure supplied to it.

4. The combination of two parallel pairs of cylinders, each pair consisting of a cylinder closed at its rear end and a smaller cylinder projecting from its front end and opening into it, the pistons of these cylinders, rods connecting the pistons of each pair, means for admitting fluid under pressure continuously to the space between the pistons of each pair, and means for alternately admitting fluid under pressure to the rear end of the larger cylinder of one pair of cylinders and then of the other and simultaneously allowing it to escape from the larger cylinder which is not having fluid under pressure admitted to it.

5. The combination of two parallel pairs of cylinders each pair consisting of a cylinder closed at its rear end and a smaller cylinder projecting from its front end and opening into it, the pistons of these cylinders, rods connecting the pistons of each pair, means for admitting fluid under pressure continuously to the space between the pistons of each pair, two swinging pick-arms, links connecting these arms to the two pairs of pistons and means for alternately admitting fluid under pressure to the rear end of the larger cylinder of one pair of cylinders and then to the other and simultaneously allowing it to escape from the rear end of the larger cylinder which is not having fluid under pressure supplied to it.

THOMAS WRIGHTSON.
JOHN MORISON.

Witnesses to the signature of Thomas Wrightson:
FREDERICK GEORGE NESBITT,
WILLIAM SINCLAIR REID.

Witnesses to the signature of John Morison:
MAURICE C. HILL,
JOSEPH GARDNER.